Patented Aug. 12, 1952

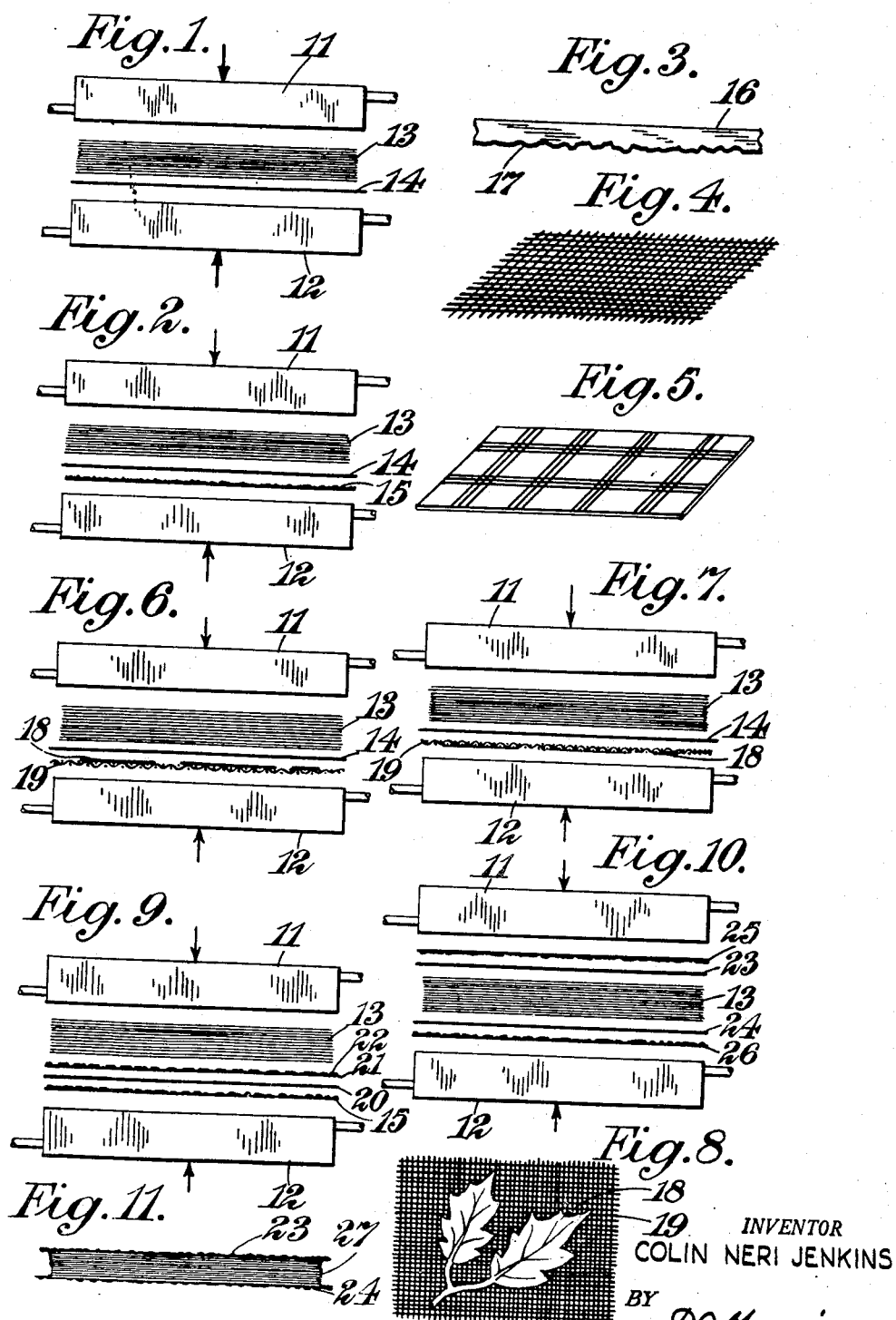

2,606,855

UNITED STATES PATENT OFFICE 2,606,855

PLATE OR DIE FOR PRESSING OR MOLDING

Colin Neri Jenkins, Sheldon, Birmingham, England, assignor, by mesne assignments, to Union Carbide and Carbon Corporation, a corporation of New York Application March 15, 1947, Serial No. 735,032
In Great Britain March 21, 1946

1 Claim. (Cl. 154—106)

This invention is for improvements in or relating to plates or dies for pressing or moulding and in particular to dies for the moulding of products having surfaces in relief.

In the manufacture of laminated products consisting of fibrous sheets, such as paper or fabric, impregnated and bonded with resinous binders, it is usual to mould a stack of the impregnated sheets between stainless steel plates. These plates have the necessary rigidity and strength to withstand the moulding stresses and, further, if adequately polished they impart a correspondingly smooth finish to the moulded article. A further advantage of stainless steel plates is that there is no adhesion between the metal and the hardened moulding, the latter being readily released on the completion of the moulding operation.

Stainless steel plates are widely used in the preparation of laminated products having plane surfaces, but even in such cases they are expensive to manufacture and heavy to handle. When, however, stainless steel plates or dies are required to mould products having surfaces in relief the cost rises disproportionately, particularly since in general it is necessary to stock a large number of dies to meet the requirements moulding operation.

It is an object of the present invention to form a die which has the desirable characteristics of a metal die, but which is simply, quickly and inexpensively manufactured and further is light in weight with the consequent advantage of ease in handling.

According to the present invention, a plate or die for pressing or moulding possessing a plane surface or the negative impression of a surface in relief comprises a foundation of fibrous sheets impregnated and bonded with a thermosetting synthetic resin, e. g. a phenol-formaldehyde synthetic resin, which foundation is surfaced with metal foil.

The invention also includes the products pressed or moulded by the use of such a plate or die and particularly products consisting of laminated fibrous sheets impregnated and bonded with resinous binders.

The plate or die may be prepared in one of several ways. In one method a metal foil is placed on a sheet material the contour of whose surface it is desired to reproduce (hereinafter referred to as the "pattern-producing sheet"), and on the metal foil is placed a stack of paper or fabric sheets impregnated with thermosetting synthetic resin. The stack is subjected to heat and pressure to harden the resin and to form the impregnated sheets with the metal foil into a composite board from which, on completion of the moulding operation, the pattern-producing sheet is removed. The surface of the composite board possesses the negative impression of the surface which it is desired to reproduce.

The pattern-producing sheet may take a wide variety of forms. It may, for instance, be a fabric e. g. an open weave fabric, a wire mesh or an embossed or engraved plate. It may also be composite in nature and may consist e. g. of a metal foil over an open weave fabric or of a patterned top sheet or article to produce a design superimposed on a background pattern.

In general, it is advisable to ensure adequate adhesion of the metal foil to the stack of impregnated sheets. Thus, it is advantageous to coat the foil with an adhesive additional to that contained in the impregnated sheets. An adhesive should be used which adheres well to metal and one convenient adhesive is a blend of a polyvinyl acetal resin such as the butyral with a thermosetting phenol-aldehyde resin.

When using aluminium foil, satisfactory adhesion may be obtained by first anodising the aluminium, and before the anodised surface has lost its absorbency applying to it a hardenable synthetic resin as described in specification No. 587,496, filed in the United States Patent Office on April 10, 1945, by N. W. Knewstubb and A. M. Jamieson, now U. S. Patent No. 2,552,285.

The invention is illustrated by the accompanying diagrammatic drawings in which similar parts are denoted by similar reference numerals.

Figure 1 shows the upper and lower heated platens 11 and 12 of a hydraulic press. Between the platens are a stack of resin-impregnated sheets 13 and a metal foil 14 for the formation of a pressing plate having a plane surface.

In Figure 2 similar platens have between them a pack of sheets 13, a metal foil 14 and a pattern-producing sheet 15.

Figure 3 shows the plate 16, faced with foil 17 after pressing the assembly shown in Figure 2 and removing the pattern-producing sheet 15.

Figure 4 is a perspective view of a pattern-producing sheet consisting of open-weave fabric, and Figure 5 is a perspective view of a pattern-producing sheet consisting of an engraved metal plate.

In Figure 6 the assembly of resin-impregnated sheets 13 and metal foil 14 has beneath it plane pieces of metal foil 18 lying upon a sheet of fabric 19.

An alternative arrangement to that shown in Figure 6 is shown in Figure 7 in which the plane pieces of metal foil 18 are located between the lower platen 12 and the fabric 19.

Figure 8 indicates the type of composite pattern-producing sheet which may be constituted by the foil 18 and fabric 19 of Figures 6 and 7.

Figure 9 shows the employment of a pack of sheets 13, a pattern-producing sheet 15 and, interposed between them, two metal foils 20 and 21, the upper surface of 21 being provided with a film of adhesive 22.

In Figure 10 there is shown the production of a plate or die both surfaces of which have negative impressions of surfaces in relief. A pack of resin-impregnated sheets 13 is sandwiched between metal foils 23, 24 and pattern-producing sheets 25 and 26.

Figure 11 shows the plate or die resulting from pressure of the assembly shown in Figure 10 and subsequent removal of the pattern-producing sheets 25 and 26. The laminated sheet 27 is faced on each surface with foils 23 and 24 bearing the impression of the pattern-producing sheets 25 and 26.

Following is a description by way of example of methods of carrying the invention into effect.

*Example I*

This example describes the production of a die for pressing or moulding a laminated board or a thermoplastic sheet with a lace-like surface in relief.

The components of the laminated die are assembled in the following order:

12 sheets of cotton fabric (2½ oz./sq. yd.) treated with a heat-hardenable resin formed by reacting phenol with a molecular excess of formaldehyde in the presence of an alkaline catalyst.

1 sheet of aluminium foil 0.004" thick anodised and resin-treated on one side viz. on the side which is to be adjacent to the impregnated fabric sheets as described in specification No. 587,496, now U. S. Patent No. 2,552,285.

On the aluminium surface of this assembly is laid a pattern-producing sheet consisting of lace fabric, and the assembly is moulded in a hydraulic press between polished steel sheets for 60 minutes at 170° C. under pressure of 1,500 lbs./sq. in. During this process, the foundation of resin-impregnated fabric sheets becomes sufficiently plastic to allow the aluminium surface to take the imprint of the lace fabric and thereafter with the continued application of heat, the resin cures to the infusible state. The assembly is cooled while still under pressure and extracted from the press when cold. The pattern-producing sheet is stripped from the aluminium-faced composite board which may then be used as a die for moulding.

In a modified form of this process, the aluminium sheet is anodised and resin-treated on both sides, and then used in conjunction with a second aluminium foil, e. g. 0.001" thick, which is not anodised or resin treated. Preferably, the surface aluminium sheet is brush-finished at least on that surface adjacent to the anodised sheet.

*Example II*

This example describes the production of a die for pressing or moulding a laminated board or a thermoplastic sheet having a stippled finish suitable for decorative purposes or as a non-skid flooring.

The components of the laminated die are assembled as follows:

20 sheets of kraft paper, each 5 mils. thick, treated with a heat-hardening resin formed by reacting cresol with a molecular excess of formaldehyde in the presence of an alkaline catalyst.

1 sheet of 0.004" thick aluminium foil brush-finished and treated on one side with an adhesive consisting of a blend of a heat-hardenable phenol-formaldehyde resin and polyvinyl butyral.

On the aluminium surface of the assembly is placed a metal plate having the stippled surface which it is desired to reproduce, and the whole is moulded under the conditions outlined in Example I.

If desired, the die may be prepared with a relief surface on both sides and the two surfaces may have the same or different designs.

I claim:

A process for the preparation of an embossing die for plastic material, which comprises assembling a stack of fibrous sheets impregnated with partially condensed thermosetting resin, a pattern producing sheet proof against damage when subjected to a resin curing temperature of 170° C., and interposed between said stack and pattern producing sheet a metal foil; applying heat and pressure to the assembly, the heat being at resin curing temperature causing the foundation of resin impregnated sheets to become sufficiently plastic to allow the metal foil to take the imprint of the pattern producing sheet, and the pressure being sufficient to impress the pattern producing sheet into the foil, the degrees of heat and pressure being continued on the assembly including said pattern producing sheet throughout the entire time that the fibrous sheets are subjected to heat and pressure until the resin cures to the infusible state to consolidate the stack and form a resin bonded metal foil surfaced fibrous laminated die; and thereafter stripping said pattern producing sheet from the finished die.

COLIN NERI JENKINS.

REFERENCES CITED

The following references are of record in the file of this patent:

UNITED STATES PATENTS

| Number | Name | Date |
|---|---|---|
| 1,377,512 | Novotny | May 10, 1921 |
| 1,398,142 | Novotny | Nov. 22, 1921 |
| 1,744,345 | Swanson | Jan. 21, 1930 |
| 1,844,512 | Mains | Feb. 9, 1932 |
| 2,070,023 | Olsen | Feb. 9, 1937 |
| 2,205,466 | Caprio et al. | June 25, 1940 |
| 2,211,601 | Hensley | Aug. 13, 1940 |
| 2,276,035 | Guhl | Mar. 10, 1942 |
| 2,306,256 | Wickwire | Dec. 22, 1942 |
| 2,318,184 | Rojas | May 4, 1943 |
| 2,403,077 | Hershberger | July 2, 1946 |
| 2,552,285 | Knewstubb et al. | May 8, 1951 |

FOREIGN PATENTS

| Number | Country | Date |
|---|---|---|
| 83,887 | Switzerland | Feb. 2, 1940 |